United States Patent
Albrecht et al.

(10) Patent No.: US 9,709,154 B2
(45) Date of Patent: Jul. 18, 2017

(54) PULLEY DEVICE FOR CHAIN OR BELT

(71) Applicants: Dirk Albrecht, Eschweiler (DE); Romuald Lescorail, Saint Cyr sur Loire (FR); Frederic Liege, Monts (FR); Nicolas Tronquoy, Fondettes (FR)

(72) Inventors: Dirk Albrecht, Eschweiler (DE); Romuald Lescorail, Saint Cyr sur Loire (FR); Frederic Liege, Monts (FR); Nicolas Tronquoy, Fondettes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 105 days.

(21) Appl. No.: 14/799,642

(22) Filed: Jul. 15, 2015

(65) Prior Publication Data

US 2016/0017977 A1    Jan. 21, 2016

(30) Foreign Application Priority Data

Jul. 17, 2014   (FR) ..................... 14 56887

(51) Int. Cl.
  *F16H 55/36*   (2006.01)
  *F16C 41/04*   (2006.01)
  (Continued)

(52) U.S. Cl.
  CPC .............. *F16H 55/36* (2013.01); *F16B 1/00* (2013.01); *F16C 13/006* (2013.01);
  (Continued)

(58) Field of Classification Search
  CPC .... F16H 55/36; F16H 7/20; F16H 2007/0865; F16B 1/10; F16C 13/006; F16C 35/073;
  (Continued)

(56) References Cited

U.S. PATENT DOCUMENTS

| | | | | |
|---|---|---|---|---|
| 2011/0111900 A1* | 5/2011 | Wilson | .................. | F16C 13/006 474/166 |
| 2011/0152025 A1* | 6/2011 | Wilson | .................. | F16C 13/006 474/166 |
| 2015/0267791 A1* | 9/2015 | Hedman | ................... | F16H 7/20 474/199 |

(Continued)

FOREIGN PATENT DOCUMENTS

| | | |
|---|---|---|
| DE | 19836191 A1 | 2/2000 |
| DE | 10036765 A1 | 2/2002 |

(Continued)

*Primary Examiner* — William E Dondero
*Assistant Examiner* — Robert T Reese
(74) *Attorney, Agent, or Firm* — Bryan Peckjian; SKF USA Inc. Patent Dept.

(57) ABSTRACT

A pulley assembly comprising an inner ring, an outer ring, at least one row of rolling elements between the inner and outer rings, a pulley rotationally secured with the outer ring, having an outer radial surface for engagement with a chain or belt, a screw comprising a head and a stem radially housed inside the inner ring and having an outer peripheral groove, a mounting support element having a receiving bore or housing for receiving the screw head and an axial retaining member retaining the screw stem within the receiving housing, the member being engaged in the outer groove of the screw stem. The mounting support element includes a cavity that emerges in the receiving bore. When the screw is installed within the receiving bore, the outer groove is axially across from the mounting support element cavity and the axial retaining element is engaged in the mounting support element cavity.

11 Claims, 3 Drawing Sheets

(51) Int. Cl.
    *F16C 13/00*     (2006.01)
    *F16B 1/00*     (2006.01)
    *F16C 35/063*     (2006.01)
    *F16H 7/20*     (2006.01)
    *F16H 7/08*     (2006.01)
    *F16C 19/08*     (2006.01)

(52) U.S. Cl.
    CPC ............ *F16C 35/063* (2013.01); *F16C 41/04* (2013.01); *F16C 19/08* (2013.01); *F16C 2226/80* (2013.01); *F16C 2361/63* (2013.01); *F16H 7/20* (2013.01); *F16H 2007/0865* (2013.01)

(58) Field of Classification Search
    CPC .......... F16C 41/04; F16C 19/08; F16C 33/48; F16C 2226/80
    See application file for complete search history.

(56) References Cited

U.S. PATENT DOCUMENTS

2015/0300463 A1* 10/2015 Albrecht ................. F16C 33/58
    474/166
2016/0356375 A1* 12/2016 Chollet ................. F16C 35/073

FOREIGN PATENT DOCUMENTS

| DE | 102011077019 A1 | 12/2012 |
| EP | 2339211 A1 | 6/2011 |
| WO | 2007036407 A1 | 4/2007 |
| WO | 2010/006857 A1 | 1/2010 |

* cited by examiner

PULLEY DEVICE FOR CHAIN OR BELT

CROSS REFERENCE TO RELATED APPLICATIONS

This is a Non-Provisional Patent Application, filed under the Paris Convention, claiming the benefit of French Patent (FR) Application Number 1456887, filed on 17 Jul. 2014 (17, Jul. 2014), which is incorporated herein by reference in its entirety.

TECHNICAL FIELD

The invention relates to a pulley device for a chain or belt. Such a device may relate to tension rollers for stretching a chain or belt for transmitting movements, secondary rollers, winders, free-pulleys and any other support and rotational transmission means.

BACKGROUND ART

When such a pulley device is manufactured, it is generally equipped with a screw, a threaded end of which is designed to penetrate a tapped orifice arranged in a support on which the tension roller is provided to be mounted. To the extent possible, an untimely separation should be avoided between the screw and the rest of the pulley device between the manufacturing moment of the device and the moment of its assembly on a support, in particular within an engine compartment of a motor vehicle.

To that end, it is known from DE-A-198 36 191 to provide, in a receiving housing of the screw, a circlip for axial retention of the stem of the screw, which slides along an outer peripheral groove arranged on the stem of the screw. One drawback of this approach relates to the holding of the circlip in the inner ring of the rolling bearing, which is not lasting. Thus, the circlip may be lost during use of the device. Another drawback of this prior art relates to its bulk. The head of the screw protrudes from the inner ring of the rolling bearing, which is not desirable during the use of the device in a densely occupied volume, such as the engine compartment of a modern motor vehicle.

In this respect, it is known, for example from WO-A-2010/006857 and EP-A-2,339,211, to provide a pulley device comprising a mounting support element, a screw and a retaining member. The mounting support element is equipped with a cavity, while the screw is provided with a groove. In the assembled configuration, the groove of the screw is axially across from the cavity of the mounting support member and the retaining member is jammed between the cavity and the groove.

BRIEF SUMMARY OF THE PRESENT INVENTION

The invention more particularly aims to resolve these drawbacks by proposing a new pulley device for a chain or belt that is cost-effective to manufacture and easy to install.

To that end, the invention relates to a pulley device for a chain or belt that comprises an inner ring, an outer ring, at least one row of rolling elements mounted between the inner ring and the outer ring, a pulley secured in rotation with the outer ring and provided with an outer radial surface for engagement with a chain or belt, a screw comprising a head, and a stem radially housed inside the inner ring and provided with an outer peripheral groove. The device also comprises a mounting support element provided with a bore for receiving the stem of the screw and an axial retaining member keeping the stem of the screw inside the receiving bore, that member being engaged in the outer peripheral groove of the stem of the screw. The mounting support element is provided with a cavity that emerges in the receiving bore of the stem of the screw. When the screw is installed in the receiving bore of the device, its outer peripheral groove is axially across from the cavity of the mounting support element and the axial retaining element is also engaged in the cavity of the mounting support element. According to the invention, the mounting support element defines a housing for receiving the head of the screw.

Owing to the invention, the axial retaining member is jammed between the cavity of the mounting support element and the outer peripheral groove of the stem of the screw, which prevents it from moving and becoming lost. The screw therefore remains axially mobile, which makes it possible to handle it more easily. Furthermore, the receiving housing defined by the mounting support element makes it possible to fit the head of the screw in a protected zone. Thus, the bulk of the pulley device is reduced.

According to advantageous, but optional aspects of the invention, such a pulley device may incorporate one or more of the following features, considered in any technically admissible combination:

- The length L6 of the retaining member is equal to or slightly larger than the axial length of the cavity of the mounting support element.
- The axial length of the groove of the screw is strictly greater than the axial length of the retaining member and the difference between the axial length of the groove of the screw and the axial length of the retaining member is greater than or equal to the axial length of the receiving housing for the head of the screw.
- The axial retaining member has a frustoconical outer surface and a cylindrical central bore.
- The axial retaining member is annular. Alternatively, the axial retaining member has an axial slot facilitating placement in the cavity and the aforementioned groove.
- The axial retaining member is made from an elastic material, preferably a synthetic material or spring steel.
- The mounting support element is the inner ring.
- The mounting support element is a force-reacting plate.
- The mounting support element is a sleeve radially intercalated between the inner ring and the screw.

BRIEF DESCRIPTION OF THE DRAWINGS

The invention will be better understood and other advantages thereof will appear more clearly in light of the following description of two embodiments of a pulley device, provided solely as an example and done in reference to the appended drawings, in which.

DETAILED DESCRIPTION OF THE PRESENT INVENTION

Figure 1:
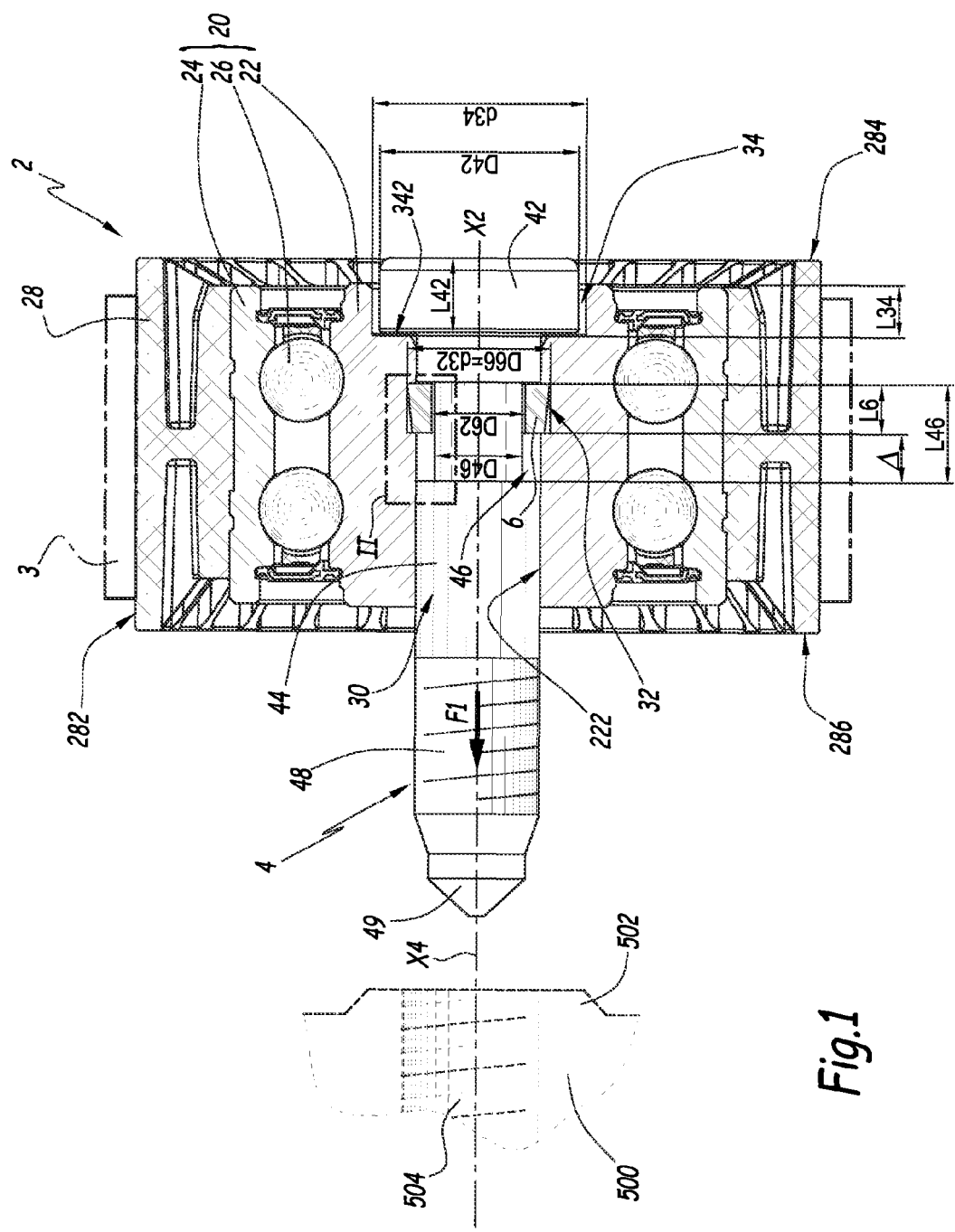
FIG. 1 is an axial sectional view of a pulley device according to the invention.
Figure 2:
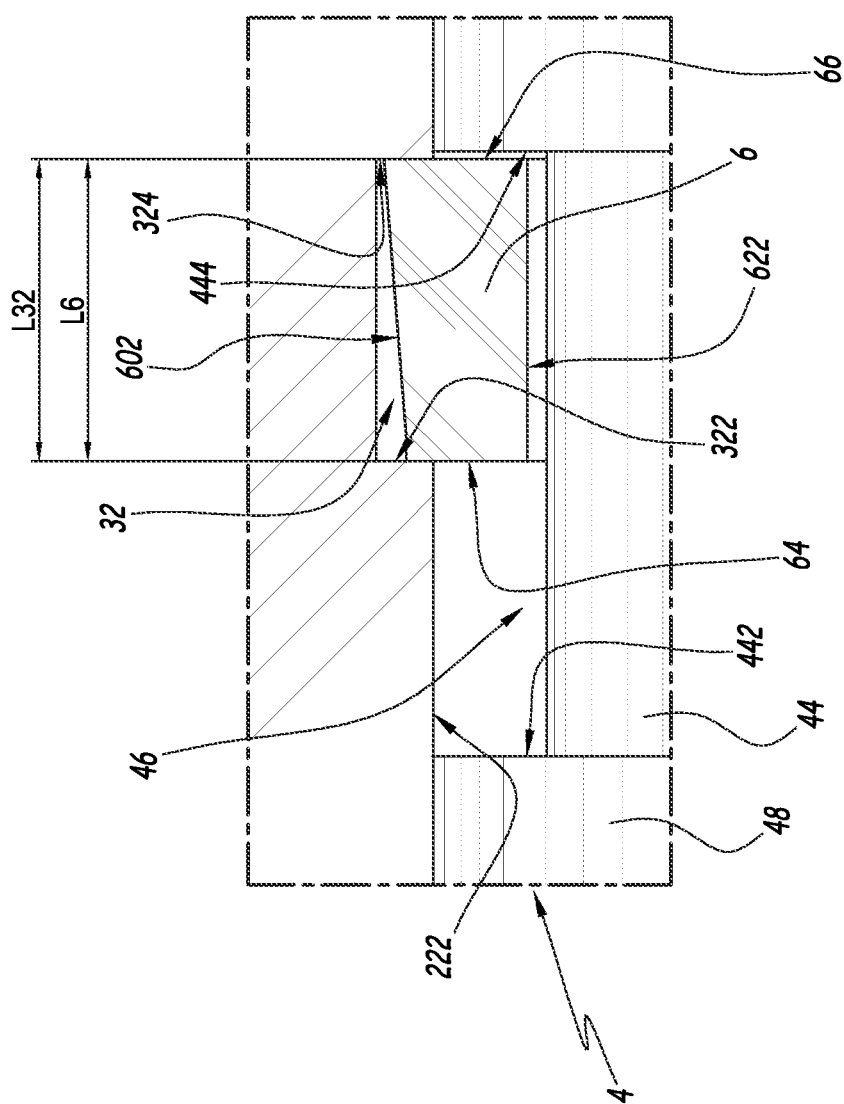
FIG. 2 is an enlarged view of detail II in FIG. 1.

The pulley device 2 shown in FIGS. 1 and 2 is a tension roller designed to be mounted on an engine block 500 that is partially shown in mixed lines in FIG. 1. This device comprises a ball bearing 20 that is formed by an inner ring 22, an outer ring 24 and at least one row of beads 26 mounted between the inner ring 22 and the outer ring 24. In particular, the pulley device 2 shown in FIG. 1 comprises two rows of beads 26.

Alternatively, the beads 26 may be replaced by other rolling elements, such as rollers or needles.

A pulley 28 is immobilized on the outer ring 24, for example by gluing, overmolding, or by tight assembly or crimping of the pulley on the outer ring. Reference 282 denotes the outer peripheral surface of the pulley 28, i.e., the surface of the pulley oriented radially toward the outside relative to a central axis X2 of the tension roller. This surface 282 is provided to receive, by bearing, a belt 3 that is shown in mixed lines in FIG. 1. In place of a belt, a chain may be mounted on the surface 282, the geometry of which is then adapted.

References 284 and 286 respectively denote the opposite axial surfaces of the pulley 28 that are perpendicular to the axis X2, the surface 286 being turned toward the engine block.

The pulley device 2 defines a central bore 30 centered on the axis X2. A screw 4, received in the bore 30, comprises a head 42 and a stem 44. Reference X4 denotes the longitudinal axis of the screw 4, which is superimposed on the axis X2 when the screw 4 is received in the bore 30. Reference 49 denotes the tip of the screw 4 opposite the head 42.

The bore 30 is defined by the inner radial surface 222 of the ring 22. The surface 222 is provided with a peripheral groove 32 that forms a cavity emerging in the bore 30. The ring 22 defines a housing 34 that emerges radially in the bore 30 and axially on the outside of the ring 22 on the side of the axial surface 284. This housing 34 is designed to receive the head 42 of the screw 4 in whole or in part. Reference 342 denotes the bottom of the housing 34, which is annular, perpendicular to the axis X2 and which surrounds the bore 30.

The stem 44 of the screw 4 is provided with an outer peripheral groove 46, which is situated along the axis X4, between the head 42 and a threaded part 48 of the stem 44. When the screw is installed in the central bore 30, its outer peripheral groove 46 is axially across from the cavity 32 of the ring 22.

The inner ring 22 is designed to bear against a boss 502 belonging to the engine block 500 when the screw 4 is tightened in a corresponding tapping 504 of that engine block. This makes it possible to immobilize the tension roller 2 relative to the engine block. The inner ring 22 therefore constitutes a mounting support element, on the engine block 500, for the tension roller 2.

Reference D42 denotes the outer diameter of the head 42 of the screw 4, and d34 denotes the inner diameter of the housing 34 of the pulley device 2. The diameter d34 is strictly larger than the diameter D42 to allow the head 42 to be housed in the housing 34.

Reference L34 denotes the length of the housing 34 measured parallel to the axis X2 and L42 denotes the length of the head 42 of the screw 4 measured parallel to the axis X4. In the illustrated embodiment, the length L42 is strictly greater than the length L34. In other words, when the screw 4 is installed in the bore 30, with its head 42 bearing against the bottom 342, that head protrudes past the housing 34 along the axis X2. In this configuration, the head 42 does not protrude past the axial surface 284 of the pulley 28 opposite the engine block 500. This makes it possible to reduce the bulk of the pulley device 2, in particular the risks of interference between the head 42 and the adjacent parts of the pulley device 2. Alternatively, the lengths L42 and L34 may be equal so as to completely incorporate the head 42 into the housing 34.

Figure 3:
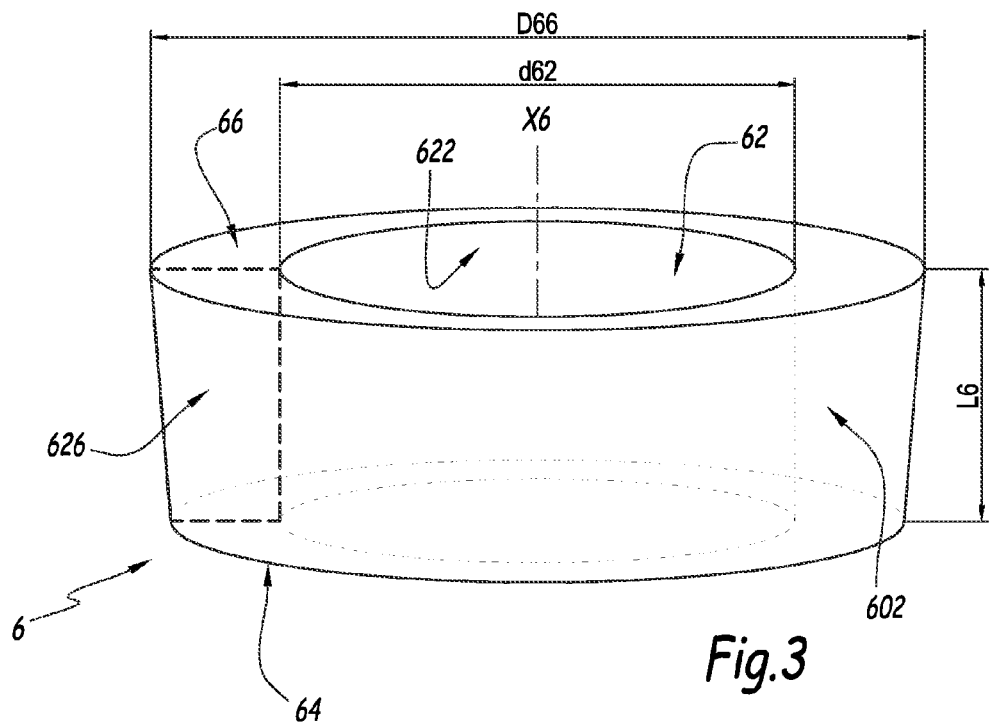
FIG. 3 is a perspective view of an axial retaining member for the device of FIGS. 1 and 2.

The pulley device 2 also comprises an annular member 6 that is centered on an axis X6, and provided with a frustoconical outer surface 602 and a cylindrical inner surface 622 that defines a central bore 62 of that member 6. Thus, the axial section of the member 6, which is shown in thick dotted lines in FIG. 3, is a rectangular trapezoid 626.

The axial retaining member 6 is made from an elastic material, preferably a synthetic material, such as an elastomer, or spring steel.

To place the member 6, it is first mounted on the stem 44 at the groove 46 of the screw 4 when it is not yet installed in the rolling bearing 20. The screw 4 is then inserted into the bore 30 on the side of the housing 34, in the direction of the arrow F1, so that the threaded part 48 protrudes from the bore 30 on the side of the axial surface 286. During the placement of the screw 4 in the bore 30, the member 6 becomes radially crushed against the inner surface 222 of the bore 30, axially between the housing 34 and the cavity 32, then regains the frustoconical shape described above. The frustoconical nature of the surface 602 facilitates the radial positioning of the member 6 relative to the bore 30 for its placement in position, then the gradual radial crushing of the member 6 in contact with the surface 222, during the insertion of the screw 4 equipped with that member into the bore 30. The screw 4 is pushed until the member 6 is found axially across from the cavity, where it is engaged by regaining its initial shape. The member 6 is then jammed between the cavity 32 and the groove 46, while the head 42 bears on the bottom 342 of the housing 34. This then leads to the pre-mounted configuration of the pulley device 2, shown in FIG. 1.

In this configuration, the screw 4 remains axially movable relative to the rolling bearing 20, since the groove 46 can slide across from the member 6. The member 6 performs an axial retaining function of the screw 4, as explained below.

Reference 442 denotes an axial surface of the stem 44 that delimits the groove 46 on the side of the tip 49, and reference 444 denotes an axial surface of the stem 44 that delimits the groove 46 on the side of the head 42. Reference 322 denotes an axial surface of the inner ring 22 that delimits the cavity 32 on the side of the surface 286, and reference 324 denotes an axial surface of the inner ring 22 that delimits the cavity 32 on the side of the surface 284. Reference 64 also denotes the annular surface with a smaller radial thickness of the member 6, and reference 66 denotes the annular surface with a larger radial thickness of the member 6.

Reference L6 denotes the axial length of the member 6 measured between the surfaces 64 and 66. Reference L32 denotes the axial length of the cavity 32 measured parallel to the axis X4. The length L6 is equal to or slightly larger than the length L32. Thus, when the member 6 is engaged in the cavity 32, its surfaces 64 and 66 are respectively bearing against the surfaces 322 and 324.

In the installed configuration of the screw 4, the cooperation of the head 42 and the bottom 324 limits the movement of the screw 4 to the left in FIG. 1. In that case, the member 6 is not biased. However, if the screw 4 moves toward the right of FIG. 1, i.e., it tends to leave the bore 30 on the side of the surface 284, the surface 442 of the screw 4 abuts against the surface 64 of the member 6, which opposes the removal of the screw 4 relative to the bore 30. The member 6 therefore constitutes a retaining member for retaining the screw 4 in the bore 30.

Since the retaining member 6 is engaged in the cavity 32, it is firmly immobilized relative to the ring 22, which allows it to constitute a stop that effectively blocks the removal of the screw 4 from the bore 30, in a direction opposite that of the arrow F1.

Reference D62 denotes the diameter of the central bore 62 of the axial retaining member 6, and reference D46 denotes the diameter of the stem 44 of the screw 4, at the outer peripheral groove 46. Reference D66 also denotes the diameter of the surface 66 of the member 6, and reference d32 denotes the diameter of the bore 30 at the cavity 32 of the pulley device 2. In order to jam the axial retaining member 6 between the cavity 32 and the groove 46, the diameter D62 is slightly larger than the diameter D46, while the diameter D66 is equal to or slightly smaller than the diameter d32.

In the installed configuration, the screw 4 remains translatable relative to the ball bearing 20 along the longitudinal axis X2. Reference L46 denotes the axial length of the outer peripheral groove 46 of the screw 4, and reference L34 denotes the axial length of the receiving housing 34 of the head 42 of the screw 4. The axial length L46 of the groove 46 of the screw 4 is strictly larger than the axial length L6 of the retaining member 6. Thus, the screw 4 can slide relative to the ring 22. Furthermore, the difference Δ between the axial length L46 and the axial length L6 is greater than or equal to the axial length L34 of the housing 34 of the head 42 of the screw 4. This yields the following relationship:

$$L46 - L6 = \Delta \geq L34 \quad \text{(Equation 1)}$$

This relationship allows the head 42 of the screw 4, when the screw 4 is translated along the axis X2, to leave the housing 34 completely and therefore to be more easily maneuverable by a user. This is particularly useful when the thread of the threaded part 48 needs to be fitted into the tapping 504 by hand.

When the head 42 of the screw 4 is outside the housing 34, the surface 64 bears both on the surface 322 of the cavity 32 and against the surface 442 of the stem 44, at the outer peripheral groove 46.

The retaining member 6 being made from an elastic material, it may deform under the compression of the surface 442. In other words, the elasticity of the member 6 makes it possible, if the user so wishes, to remove the head 42 of the screw 4 even more, and therefore to manipulate it with even greater ease.

Alternatively, the mounting support element according to the invention may be a force-reacting plate or an off-centered sleeve intercalated radially between the inner ring 22 and the screw 4. The cavity 32 and the housing 34, described above, are still arranged on the mounting support element, either in the case of an inner ring 22, which is the case shown in FIG. 1, or in the case of a force-reacting plate or sleeve, which are not shown in figures.

Figure 4:
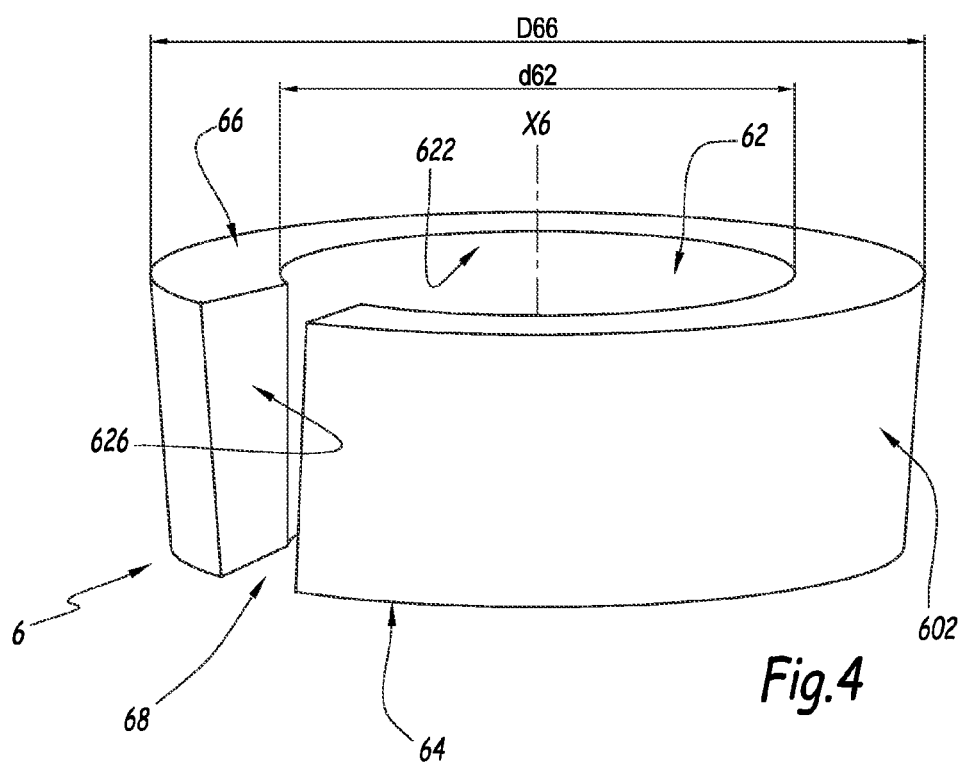
FIG. 4 is a view similar to FIG. 3 for a second embodiment.

In the embodiment of FIG. 4, the retaining member 6 differs from that of FIG. 3 in that it comprises a slot 68 that extends continuously between the surfaces 64 and 66. This slot facilitates the radial deformation of the member 6 during the insertion of the screw 4 into the bore 30 and during the passage of the member 6 from the housing 34 toward the cavity 32.

The embodiments and alternatives considered above may be combined with one another to generate new embodiments of the invention.

Such embodiments of the invention may also be provided for any type of pulley device, such as the tension rollers described here, as well as winders, free-pulleys and any other support and rotational transmission means.

The invention claimed is:

1. A pulley device for a chain or belt, comprising:
   an inner ring;
   an outer ring;
   at least one row of rolling elements mounted between the inner ring and the outer ring;
   a pulley secured in rotation with the outer ring and provided with an outer radial surface for engaging with a chain or belt;
   a screw comprising a head and a stem housed radially in the inner ring and provided with an outer peripheral groove;
   a mounting support element provided with a receiving bore for the stem of the screw; and
   an axial retaining member keeping the stem of the screw inside the receiving bore, the axial retaining member being engaged in the outer peripheral groove of the stem of the screw,
   wherein the mounting support element is provided with a cavity that emerges in the receiving bore,
   wherein, when the screw is installed in the receiving bore of the device, the outer peripheral groove is axially across from the cavity of the mounting support element and the axial retaining member is also engaged in the cavity of the mounting support element, wherein a first axial length of the axial retaining member is one of equal to or slightly larger than a second axial length of the cavity of the mounting support element,
   wherein the mounting support element defines a housing for receiving the head of the screw.

2. The device according to claim 1, wherein a third axial length of the outer peripheral groove of the screw is greater than the first axial length of the axial retaining member and a difference between the third axial length of the outer peripheral groove of the screw and the first axial length of the axial retaining member is one of greater than or equal to a fourth axial length of the housing for receiving the head of the screw.

3. The device according to claim 1, wherein the axial retaining member has a frustoconical outer surface and a cylindrical central bore.

4. The device according to claim 1, wherein the axial retaining member has an annular shape.

5. The device according to claim 1, wherein the axial retaining member has an axial slot facilitating placement in the cavity and the outer peripheral groove.

6. The device according to claim 1, wherein the axial retaining member is made from an elastic material, preferably a synthetic material or spring steel.

7. The device according to claim 1, wherein the axial retaining member is made from an elastic material, wherein the elastic material is one of a synthetic material or spring steel.

8. The device according to claim 1, wherein the mounting support element is the inner ring.

9. The device according to claim 1, wherein the mounting support element is a force-reacting plate.

10. The device according to claim 1, wherein the mounting support element is a sleeve radially intercalated between the inner ring and the screw.

11. A pulley device for a chain or belt, comprising:
    an inner ring;
    an outer ring;
    at least one row of rolling elements mounted between the inner ring and the outer ring;

a pulley secured in rotation with the outer ring and provided with an outer radial surface for engaging with a chain or belt;

a screw comprising a head and a stem housed radially in the inner ring and provided with an outer peripheral groove;

a mounting support element provided with a receiving bore for the stem of the screw; and an axial retaining member keeping the stem of the screw inside the receiving bore, the axial retaining member being engaged in the outer peripheral groove of the stem of the screw, wherein the mounting support element is provided with a cavity that emerges in the receiving bore, wherein, when the screw is installed in the receiving bore of the device, the outer peripheral groove is axially across from the cavity of the mounting support element and the axial retaining member is also engaged in the cavity of the mounting support element, wherein the mounting support element defines a housing for receiving the head of the screw, and wherein a first axial length of the outer peripheral groove of the screw is greater than a second axial length of the axial retaining member and a difference between the first axial length of the outer peripheral groove of the screw and the second axial length of the axial retaining member is one of greater than or equal to a third axial length of the housing for receiving the head of the screw.

* * * * *